May 10, 1938.  N. W. WEBB ET AL  2,116,811
WOVEN WIRE BELT AND METHOD OF MAKING THE SAME
Filed April 25, 1934    2 Sheets—Sheet 1

INVENTOR
Nelson W. Webb
BY
Prindle Bean + Mann
ATTORNEYS

May 10, 1938.   N. W. WEBB ET AL   2,116,811
WOVEN WIRE BELT AND METHOD OF MAKING THE SAME
Filed April 25, 1934   2 Sheets-Sheet 2
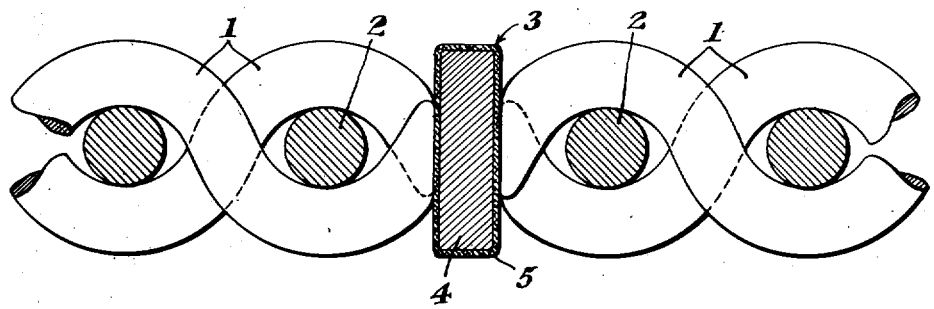
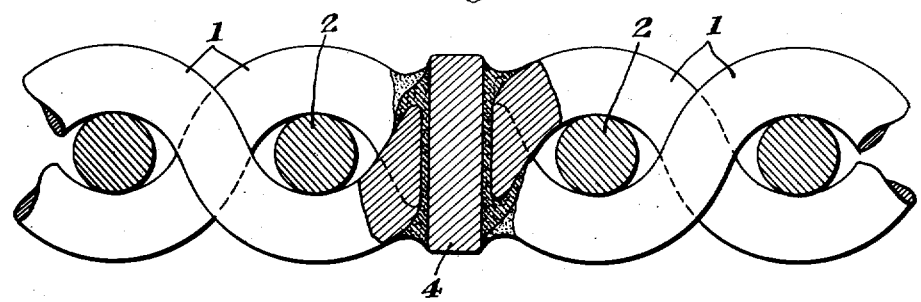
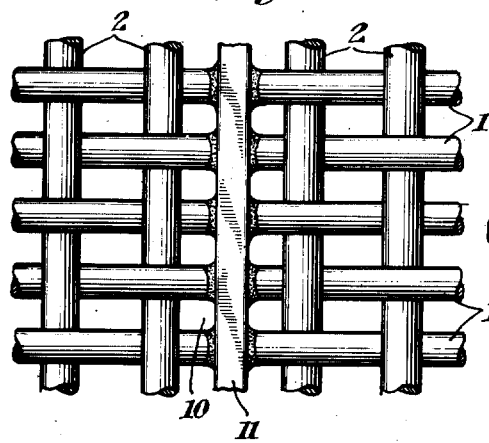
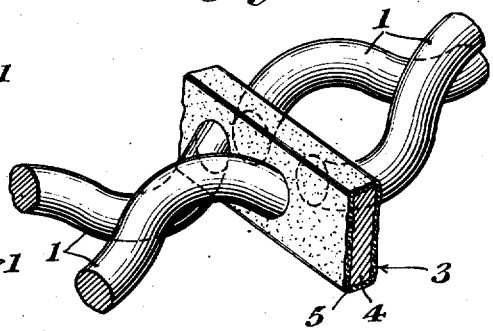
INVENTOR
*Nelson W. Webb*
BY
*Pringle Bean + Marin*
ATTORNEYS Patented May 10, 1938

2,116,811

UNITED STATES PATENT OFFICE 2,116,811

WOVEN WIRE BELT AND METHOD OF MAKING THE SAME

Nelson W. Webb, Belleville, N. J., assignor to Eastwood-Nealley Corporation, Belleville, N. J., a corporation of New Jersey Application April 25, 1934, Serial No. 722,260

30 Claims. (Cl. 245—10)

This invention relates to improvements in woven wire belts, primarily designed for use in paper making machines of the Fourdrinier type.

An object of this invention is a new method of joining the ends of a length of wire cloth into an endless belt, or in other words, a new method of forming the seam.

Another object of this invention is a new joint or seam construction for such belts.

To the accomplishment of the foregoing and such other objects as may hereinafter appear, this invention consists in the method and also the combination of parts hereinafter described and then sought to be defined in the appended claims, reference being had to the accompanying drawings forming a part hereof and which show, merely for the purpose of illustrative disclosure, two embodiments of my method and seam or joint, it being expressly understood that various changes may be made in practice within the scope of the claims without digressing from my inventive idea.

This invention relates to the same art as that of my prior Patent Number 1,821,456, issued September 1, 1931.

In the drawings—

Figure 5 is a longitudinal cross sectional view of the two end portions of a woven wire cloth with the brazing or soldering strand interposed therebetween and before brazing or soldering, this construction being a modification of that shown in Figure 1.

Figure 6 is a view similar to Figure 5 after the brazing or soldering operation has been completed.

Figure 7 is a top plan view of the construction shown in Figure 6; and

Figure 8 is a perspective view of the end portions of two pairs of warp strands together with a portion of the soldering or brazing strand.

Figure 1:
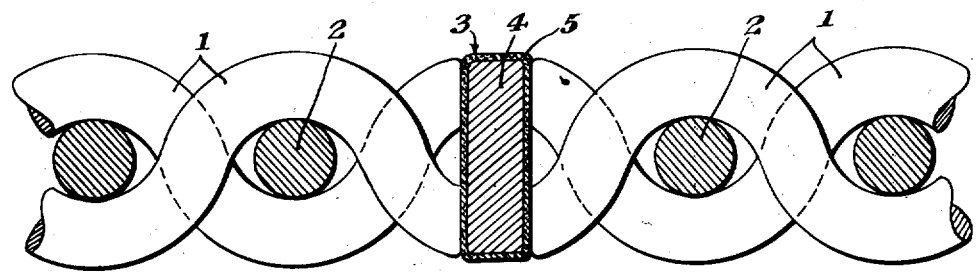
Figure 1 represents a longitudinal cross sectional view taken through the meeting end portions of a piece of woven wire cloth with the soldering or brazing strand located in position and before the brazing or soldering operation.

This method generally relates to the uniting or joining of the ends of the wire cloth by means of a brazed or soldered seam and for that purpose I utilize a single brazing or soldering strand.

Referring first to Figures 1 to 4 inclusive, the wire cloth is composed of a plurality of interwoven warp wires or strands 1 and weft wires or strands 2. These wires or strands may be of brass, bronze, or other suitable material and the weave may be a plain weave as indicated, or of other design.

After the wire cloth is woven, the end portions of the warp wires or strands at each end are cut or faced so as to permit the removal of at least one weft wire or strand 2 from each end, leaving adjacent warp ends in the form of an open claw, as viewed from the side. These warp ends may be cut or faced back further if desired.

The connection between the ends of the fabric is provided by means of a soldering or brazing element 3 which is composed of a core or body 4 of non-fusible or hard metal and a coating or surface 5 of fusible metal. The non-fusible or hard core or body may be made of bronze, nickel, or bronze or nickel alloy or other suitable material and the fusible coating or surface may be formed of hard or soft solder. Preferably hard or silver solder is used instead of the soft or tin solder.

The core or body 4 (Fig. 1) is of elongated rectangular shape in cross section, its length being substantially the full thickness of the cloth or fabric and its width being approximately the same as the diameter of the weft wires or strands 2.

Figure 2:
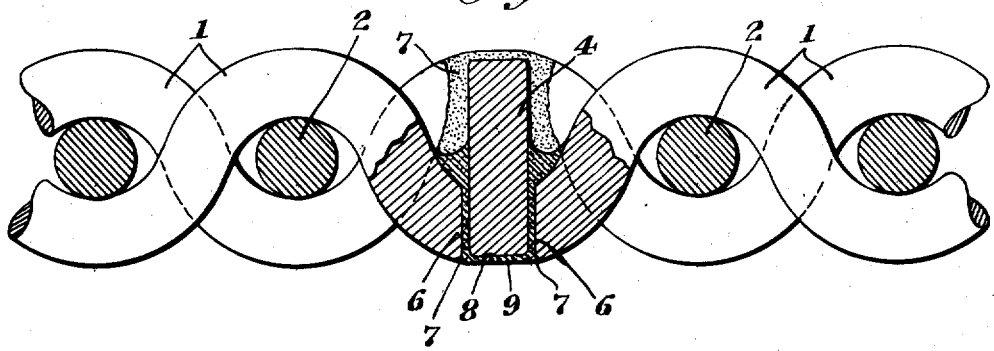
Figure 2 is a similar view after the parts have been brazed or soldered together.
Figure 3:
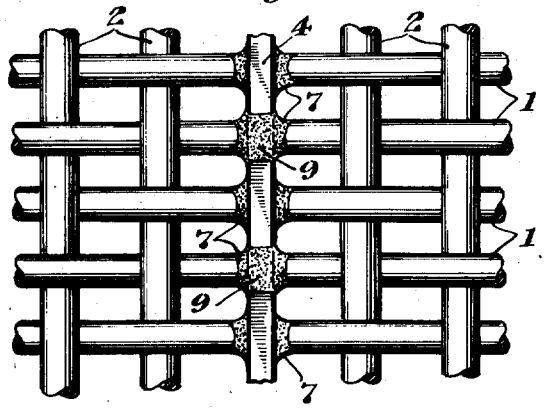
Figure 3 is a top plan view of a portion of the woven wire belt adjacent the joint or seam shown in Figure 2.
Figure 4:
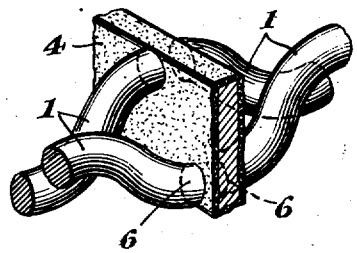
Figure 4 is detailed perspective view of the ends of two pairs of warp wires associated with a portion of the soldering or brazing strand.

In forming the seam or joint the two ends of the fabric having been prepared as previously described are brought against the opposite side faces of this connecting element 3 as illustrated in Figure 1 and while held in that position the fusing flame or heat is applied to the connecting element so as to cause the coating to be fused and to securely connect the ends of the warps of both ends of the fabric to the non-fusible core or body 4, as illustrated in Figures 2 and 4 of the drawings. It is to be noted that by thus forming and connecting the parts, the non-fusible core or body 4 takes the place of a single weft wire or strand, as far as position is concerned, so that the openings or interstices on either side of the joint or seam are equal to or greater than the standard openings or spaces throughout the body of the cloth or fabric. It is also to be noted that after the joint or seam is formed, the fusible material is positioned between the ends 6 of the warps and the non-fusible core or body 4, as indicated at 7, and also that the fusible material covers the edge portion 8 of the non-fusible core or body at intervals as indicated at 9 in Figures 2 and 3. During soldering, the fusible metal flows toward the junctions of the warp ends 6 with the connecting element 3, and collects at these junctions, as clearly shown in the drawings. This results in giving the seam or joint the same thickness as the body of the cloth or fabric as a whole.

In the modification of the invention shown in Figures 5 to 8 inclusive, the cloth or fabric is woven in the same manner and is composed of the warp wires 1 and the weft wires 2. The ends of the wire cloth, instead of being cut in such a way as to permit the insertion of the connection element in place of a weft wire are cut so that this element is positioned along what might be termed the intersections or crossings of the warp wires, when the cloth is viewed from the edge. This connecting element 3 is of the same construction as that shown in Figure 1 and the ends of the fabric are connected thereto by the same method, but due to its position with respect to the warp and weft wires, the spaces 10 on either side of the joint or seam 11 are less in length than the spaces between the warps and wefts throughout the body of the cloth or fabric.

It is therefore seen that this invention in its preformed form embodies the use of a single connecting element which is in the form of a ribbon or strand of elongated rectangular shape in cross section, its longest dimension approximating the thickness of the fabric. The result is that a very strong seam or joint structure is provided with a minimum amount of solder or fusible material exposed to the friction of the parts of the Fourdrinier machine. Furthermore, in the form shown in Figures 1 to 4 inclusive, the openings or spaces on each side of the seam are at least of standard dimension so that there is no tendency to clog or otherwise interfere with proper drainage, or to mark the paper. The construction lends itself to easy and cheap manufacture, insures proper operation and long life in use and provides a very strong seam or joint.

What I claim is:

1. Wire fabric or cloth comprising fabric parts, and a strand of hard metal interposed between edges of the fabric parts and having a facing of fusible metal, the end edge faces of the fabric parts engaging and having a soldered connection with opposite sides of said strand.

2. Wire fabric or cloth comprising fabric parts, and a ribbon of hard metal interposed between edges of the fabric parts, the edges of the fabric parts having a soldered connection with the opposite sides of said ribbon, and the width of the ribbon extending transversely of the plane of the fabric.

3. Wire fabric or cloth comprising fabric parts, and a strand of hard metal interposed between edges of the fabric parts and having a soldered connection therewith, said strand extending approximately to at least one of the surface planes of the fabric to present a wearing surface.

4. Wire fabric or cloth comprising fabric parts, and a ribbon of hard metal interposed between edges of the fabric parts and faced at opposite sides with fusible metal, the end edges of the fabric parts having a soldered connection with the opposite sides of said ribbon.

5. Wire fabric or cloth comprising fabric parts having warp and weft wires, the warp wires of each part being cut parallel to and at a distance from the end weft wire, and a strand of hard metal interposed between the edges of the fabric parts, the end faces of the warp wires at said edges abutting against opposite sides of said strand and having a soldered connection therewith.

6. The method of producing a joint in a wire fabric, which consists in interposing between spaced edges of the fabric parts to be joined a strand of hard metal having a facing of fusible metal at opposite sides, pressing the edge faces of the fabric parts against the opposite sides of the strand, and melting the facing to unite the fabric edges to said strand while said edges are pressed toward each other.

7. The method of producing a joint in a wire fabric, which consists in interposing between spaced edges of the fabric parts to be joined a strand of hard metal and strands of fusible metal at opposite sides of said hard metal strand, pressing the edges of the fabric parts against the fusible metal strands to urge said strands against the opposite sides of said hard metal strand, and melting the fusible metal strands to unite the fabric edges to said hard metal strand while said edges are pressed toward each other.

8. Wire fabric comprising fabric parts having woven wires with end faces at the edges of the parts, and a strand of hard metal interposed between the edges of the fabric parts and having a facing of fusible metal, the end faces of the wires engaging and having a soldered connection with opposite sides of said strand.

9. A method of making a joint for a wire fabric, consisting of interposing a laminated strand of fusible and non-fusible metal between the edges of the fabric parts to be joined, placing the end edges of the fabric parts against opposite faces of the strand, and fusing the strand so as to provide a bridge piece of nonfusible metal that is united to the ends of the fabric.

10. A method of making a joint for a wire fabric, which consists in interposing a ribbon of fusible and non-fusible metal between the spaced edges of the fabric parts to be joined, holding the end edges of the parts into contact with the side faces of the ribbon, and then applying heat sufficient to melt the fusible metal and thereby to unite the non-fusible ribbon to the ends of the fabric.

11. In combination, wire-fabric or cloth parts whose end edges comprise projecting longitudinal wires; a non-fusible connecting element interposed between said edges with the aforesaid projecting longitudinal wires united to the sides of said connecting element, the top and bottom of said element being substantially at the top and bottom of the fabric.

12. The method of producing a joint in wire cloth which comprises, interposing a non-fusible connecting element between the ends of the cloth and securing the ends of the longitudinal wires endwise to the side faces of the connecting element by means of fusible metal.

13. The method of producing a joint in wire cloth which comprises, interposing a non-fusible connecting element of elongated cross section between the ends of the cloth with its long sides transverse to the plane of the cloth and uniting the ends of the longitudinal wires to said long sides of the connecting element.

14. The method of producing a joint in wire cloth which comprises, removing a transverse wire from each end of the cloth, shortening the longitudinal wires at each end of the cloth, interposing a non-fusible connecting element of elongated cross section on edge between said cloth-ends and uniting the ends of the longitudinal wires to the long sides of said element.

15. In the method of forming a joint for wire cloth parts, positioning a non-fusible connecting element at one end of a wire cloth part and securing the end of said wire cloth part to the side face of said connecting element by means of fusible metal.

16. In combination, a wire fabric or cloth part having a non-fusible connecting element positioned at one end thereof with the projecting wire ends of the wire fabric or cloth part united to the side face of said element by fusible metal.

17. In combination, a wire fabric or cloth part having a non-fusible connecting element positioned at one end thereof, said connecting element being of rectangular cross section and having the projecting wire ends of the wire fabric or cloth part united to one side face of said connecting element by fusible metal.

18. In combination, a wire fabric or cloth part having a non-fusible connecting element positioned at one end thereof, said connecting element being of elongated rectangular cross section and the projecting wire ends of said wire fabric or cloth being united to one of the longer sides of said connecting element by fusible metal.

19. A seam for woven wire comprising a woven wire fabric having two opposed edges on opposite sides of the seam, said edges extending parallel to the weft wires and transversely of the warp wires, the weft wire nearest to each edge being positioned slightly back therefrom so that the ends of the warp wires project beyond said weft wires, a reinforcing member positioned between the opposed ends of said warp wires and having an elongated cross-sectional form with its greater dimension disposed perpendicular to the direction of the warp wires and its smaller dimension disposed in the same direction as the warp wires so that the ends of said warp wires abut against said reinforcing member on its two opposite sides of greater extent, and soldered connections between said reinforcing member and the projecting ends of said warp wires.

20. A seam for woven wire comprising a woven wire fabric having two opposed edges on opposite sides of the seam, said edges extending parallel to the weft wires and transversely of the warp wires, the weft wire nearest to each edge being positioned slightly back therefrom so that the ends of the warp wires project beyond said weft wires, a seam connecting member positioned between the opposed ends of said projecting warp wires comprising an inner reinforcing member and a layer of fusible material on each side thereof, said projecting ends of the warp wires abutting against the connecting member and being secured thereto by means of said fusible material.

21. A seam for woven wire comprising a woven wire fabric having two opposed edges on opposite sides of the seam, said edges extending parallel to the weft wires and transversely of the warp wires, the weft wire nearest to each edge being positioned slightly back therefrom so that the ends of the warp wires project beyond said weft wires, a seam connecting member positioned between the opposed ends of said projecting warp wires comprising an inner reinforcing member, the width of which is substantially equal to the total thickness of the woven wire fabric and the thickness of which is not greater than the diameter of the weft wires and also comprising a layer of fusible material on each side of the reinforcing member, said projecting ends of the warp wires being secured to said seam connecting member by means of said fusible material.

22. Method of joining the ends of a papermaking fabric of open weave texture having warp wire loops threaded by weft wires, which method comprises forming the fabric ends to be joined so as to comprise free-ended warp wires forming partial warp loops, placing between them a metal strip having a thickness approximating that of a weft wire and a height approximating the thickness of the fabric at the middle portion of the ordinary warp loops, and integrating the free ends of said warp wires to opposite faces of said strip.

23. Method of joining the ends of a paper making fabric of open weave texture having warp wire loops threaded by weft wires, which method comprises forming the fabric ends to be joined so as to comprise free-ended warp wires forming partial warp loops, placing between them a metal strip having a thickness approximating that of a weft wire and a height approximating the thickness of the fabric at the middle portion of the ordinary warp loops, and integrating the free ends of said warp wires to opposite faces of said strip, whereby the spacing between the metal strip and the immediately adjacent weft wires may be made the same as or greater than the ordinary weft wire spacing of the fabric.

24. An endless open weave fabric for paper making machines having warp wire loops threaded by weft wires, said fabric comprising ends united by a transverse joint wherein there is no weft wire in the warp loops and wherein its place is taken by a metallic strip arranged on edge with its top and bottom edges corresponding with the top and bottom of the fabric and with the faced off free ends of the warp wires united to its sides, the length of said warp wire ends being such that the spacing lengthwise of the fabric between said strip and the immediately adjacent weft wires is substantially the same as that between the ordinary weft wires of the fabric.

25. An endless open weave fabric for paper making machines having warp wire loops threaded by weft wires, said fabric comprising ends united by a transverse joint consisting of a metal strip having a thickness approximating that of a weft wire and a height approximating the thickness of the fabric at the middle portion of the ordinary warp loops, said strip being located between said fabric ends which severally consist of the projecting ends of their warp wires, each fabric end thereby constituting a partial warp loop, said projecting warp wires being integrated endwise to the sides of the aforesaid metal strip.

26. A seam for a wire cloth fabric including a metal strip having a height approximating the normal thickness of the fabric, the free ends of the warp wires of each end of the cloth being connected to the said strip by fusible metal.

27. In a wire cloth fabric, a length of woven wire cloth comprising longitudinal and transverse wires, a connecting element disposed between the ends of said wire cloth, said connecting element having a core or body of non-fusible metal of elongated rectangular cross section, said ends of the cloth having projecting longitudinal wires united end-on to the longer sides of said connecting element, which sides are transverse to the general plane of the cloth.

28. In a wire cloth fabric, a length of woven wire cloth comprising longitudinal and transverse wires, a connecting element interposed between the ends of said wire cloth comprising a core or body of non-fusible metal, rectangular in cross section and having a coating of fusible metal connecting the ends of the longitudinal wires to the sides of said core or body which are transverse to the general plane of the cloth.

29. A seam for woven wire comprising a woven wire fabric having two opposed edges on opposite sides of the seam, said edges extending parallel to the weft wires and transversely of the warp wires, the weft wire nearest to each edge being positioned slightly back therefrom so that the ends of the warp wires project beyond said weft wires, a reinforcing member positioned between the opposed ends of said warp wires so that said ends abut thereagainst, and soldered connections between said reinforcing member and the projecting ends of said warp wires.

30. A seam for woven wire comprising a woven wire fabric having two opposed edges on opposite sides of the seam, said edges extending parallel to the weft wires and transversely of the warp wires, the weft wire nearest to each edge being positioned slightly back therefrom so that the ends of the warp wires project beyond said weft wires, a reinforcing member of substantially rectangular cross-sectional form positioned between the opposed ends of said warp wires, the thickness of said member being approximately equal to the diameter of the wires and the width being approximately equal to the total thickness of the woven wire fabric, the opposed projecting ends of the warp wires abutting against the sides of said member, and soldered connections between said projecting ends of the warp wires and said member.

NELSON W. WEBB.

CERTIFICATE OF CORRECTION.

Patent No. 2,116,811. May 10, 1938.

NELSON W. WEBB.

It is hereby certified that error appears in the above numbered patent requiring correction as follows: In the heading to the drawings, sheets 1 and 2, name of inventor, for "N. W. WEBB ET AL" read N. W. WEBB; page 2, first column, line 28, for "preformed" read preferred; and that the said Letters Patent should be read with these corrections therein that the same may conform to the record of the case in the Patent Office.

Signed and sealed this 28th day of June, A. D. 1938.

(Seal)

Henry Van Arsdale,
Acting Commissioner of Patents.

wire cloth comprising longitudinal and transverse wires, a connecting element interposed between the ends of said wire cloth comprising a core or body of non-fusible metal, rectangular in cross section and having a coating of fusible metal connecting the ends of the longitudinal wires to the sides of said core or body which are transverse to the general plane of the cloth.

29. A seam for woven wire comprising a woven wire fabric having two opposed edges on opposite sides of the seam, said edges extending parallel to the weft wires and transversely of the warp wires, the weft wire nearest to each edge being positioned slightly back therefrom so that the ends of the warp wires project beyond said weft wires, a reinforcing member positioned between the opposed ends of said warp wires so that said ends abut thereagainst, and soldered connections between said reinforcing member and the projecting ends of said warp wires.

30. A seam for woven wire comprising a woven wire fabric having two opposed edges on opposite sides of the seam, said edges extending parallel to the weft wires and transversely of the warp wires, the weft wire nearest to each edge being positioned slightly back therefrom so that the ends of the warp wires project beyond said weft wires, a reinforcing member of substantially rectangular cross-sectional form positioned between the opposed ends of said warp wires, the thickness of said member being approximately equal to the diameter of the wires and the width being approximately equal to the total thickness of the woven wire fabric, the opposed projecting ends of the warp wires abutting against the sides of said member, and soldered connections between said projecting ends of the warp wires and said member.

NELSON W. WEBB.

CERTIFICATE OF CORRECTION.

Patent No. 2,116,811.     May 10, 1938.

NELSON W. WEBB.

It is hereby certified that error appears in the above numbered patent requiring correction as follows: In the heading to the drawings, sheets 1 and 2, name of inventor, for "N. W. WEBB ET AL" read N. W. WEBB; page 2, first column, line 28, for "preformed" read preferred; and that the said Letters Patent should be read with these corrections therein that the same may conform to the record of the case in the Patent Office.

Signed and sealed this 28th day of June, A. D. 1938.

(Seal)

Henry Van Arsdale,
Acting Commissioner of Patents.

CERTIFICATE OF CORRECTION.

Patent No. 2,116,811.  May 10, 1938.

NELSON W. WEBB.

It is hereby certified that error appears in the above numbered patent requiring correction as follows: In the heading to the drawings, sheets 1 and 2, name of inventor, for "N. W. WEBB ET AL" read N. W. WEBB; page 2, first column, line 28, for "preformed" read preferred; and that the said Letters Patent should be read with these corrections therein that the same may conform to the record of the case in the Patent Office.

Signed and sealed this 28th day of June, A. D. 1938.

Henry Van Arsdale,
Acting Commissioner of Patents.

(Seal)